United States Patent
Zhang et al.

(10) Patent No.: US 6,828,749 B2
(45) Date of Patent: Dec. 7, 2004

(54) FULL-CLOSED CONTROL APPARATUS

(75) Inventors: Wennong Zhang, Fukuoka (JP); Yasuhiko Kaku, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/645,835

(22) Filed: Aug. 22, 2003

(65) Prior Publication Data

US 2004/0113579 A1 Jun. 17, 2004

(30) Foreign Application Priority Data

Aug. 22, 2002 (JP) .................................... P. 2002-241527

(51) Int. Cl.[7] .............................................. G05B 5/01
(52) U.S. Cl. ..................... 318/611; 318/808; 318/805; 318/798
(58) Field of Search ................................ 318/611, 808, 318/798, 805, 803, 801

(56) References Cited

U.S. PATENT DOCUMENTS 4,967,135 A * 10/1990 Ashikaga et al. ........... 318/808

FOREIGN PATENT DOCUMENTS

JP 2001-309676 A 11/2001

* cited by examiner

*Primary Examiner*—Karen Masih
(74) *Attorney, Agent, or Firm*—Sughrue Mion, PLLC

(57) ABSTRACT

A full-closed control apparatus for performing velocity control based on a velocity signal of a motor and performing position control based on a position signal of a load driven by the motor, including: an equivalent rigid system velocity loop model; a band-pass filter; an amplitude adjuster; and a unit for inputting a velocity instruction of a velocity control loop into the equivalent rigid system velocity loop model, inputting a difference signal obtained by subtracting an output of the equivalent rigid system velocity loop model from a velocity signal of the load into the band-pass filter, inputting an output of the band-pass filter into the amplitude adjuster and outputting a signal obtained by adding an output of the amplitude adjuster to an output of a position controller, as a new velocity instruction.

3 Claims, 9 Drawing Sheets

FULL-CLOSED CONTROL APPARATUS

BACKGROUND OF THE INVENTION

1. Field of the Invention

The present invention relates to a full-closed control apparatus for performing position control based on a position signal of a load driven by a motor.

2. Description of the Related Art

Generally, full-closed control for performing speed control based on a speed signal of a motor and performing position control based on a position signal of a load driven by the motor is required for accurate positioning. If rigidity in coupling the motor and the load to each other is low, it is however impossible to achieve high-speed control by ordinary full-closed control. This is because a control system vibrates at a frequency near an antiresonance frequency of a mechanical system when the gain of a position controller is increased, that is, because the upper limit of the gain of the position controller becomes lower than that in semi-closed control. To solve this problem, the present applicant has proposed a full-closed control apparatus shown in FIG. 5 in Japanese Patent OPI publication No. 2001-309676.

In FIG. 5, the reference numeral 1 designates a motor-including mechanical system which has an equivalent rigid model 5, a mechanical resonance system 6, a load principal vibration system 7, and an integration 8. Incidentally, J is inertia of a movable portion of the mechanical system, D is a coefficient of viscous friction of an equivalent rigid system, $\omega_r$ is an angular frequency of resonance, $\zeta_r$ is a viscosity coefficient of resonance, $\omega_a$ is an angular frequency of antiresonance, and $\zeta_a$ is a viscosity coefficient of antiresonance. The reference numeral 2 designates a load vibration suppression compensator which has an amplitude adjuster 9, and a band-pass filter 10. The reference numeral 3 designates a position controller. The reference numeral 4 designates a speed controller. A difference signal $E_L$ obtained by subtracting a load position signal $X_L$ from a position command $X_r$ is multiplied by a position control gain $K_p$ to thereby obtain a speed command basic signal $V_{rb}$. A difference signal obtained by subtracting a speed command $V_r$ from a load speed signal $V_L$ is input into the band-pass filter 10. An output of the band-pass filter 10 is input into the amplitude adjuster 9. A signal obtained by adding a speed command compensatory signal $V_{rh}$ as an output of the amplitude adjuster 9 to the speed command basic signal $V_{rb}$ is set as a new speed command $V_r$. A difference signal obtained by subtracting a motor speed $V_m$ from the speed command $V_r$ is input into the speed controller 4. An output of the speed controller 4 is set as a torque command $T_r$. The motor-including mechanical system 1 is driven on the basis of $T_r$.

In the related art, if the gain of the speed controller is sufficiently high, the gain of the equivalent rigid system speed loop model is approximately equal to 1 in a low-frequency region. Accordingly, the difference signal $V_{Ld}$ obtained by subtracting the speed command $V_r$ from the load speed $V_L$ can be regarded as an estimated signal of vibration contained in the load speed. When $V_{Ld}$ is phase-adjusted by the band-pass filter and gain-adjusted by the amplitude adjuster to cancel a vibration mode contained in the speed command basic signal, a position loop can be stabilized even in the case where the gain of the position controller is high.

In the related art, however, if the gain of the speed controller cannot be increased so sufficiently, the gain of the equivalent rigid system speed loop model is lower than 1 in a low-frequency region. For this reason, a low-frequency component is contained in the difference signal $V_{Ld}$ obtained by subtracting the speed command $V_x$ from the load speed $V_L$. On the other hand, because the band-pass filter is also used as a phase adjuster, a predetermined phase delay is given to the oscillation frequency $f_d$ of the position loop. Accordingly, the center frequency $f_o$ of the pass band in the band-pass filter becomes lower than the oscillation frequency $f_d$ of the position loop. When, for example, the band-pass filter is constituted by a combination of a two-stage low-pass filter $(1/(1+T_f s))$ and a two-stage high-pass filter $(T_f s/(1+T_f S))$ in the case where the oscillation frequency $f_a$ of the position loop is 40 Hz, the center frequency $f_o$ of the pass band in the band-pass filter is 16.6 Hz (FIG. 6) because a phase delay of 90° is given to a point of 40 Hz.

Because the speed command compensatory signal $V_{rh}$ contains a low-frequency component with a large amplitude as described above, there is a problem that low-frequency vibration or overshooting is apt to occur (FIG. 8).

SUMMARY OF THE INVENTION

Therefore, an object of the invention is to provide an apparatus by which the problem in the related art can be solved and by which while the vibration of a position loop can be suppressed, the position control gain can be increased to achieve speedy and accurate positioning.

To achieve the foregoing object, the invention provides a full-closed control apparatus for performing speed control based on a speed signal of a motor and performing position control based on a position signal of a load driven by the motor, including: an equivalent rigid system speed loop model; a band-pass filter; an amplitude adjuster; and a unit for inputting a speed command of a speed control loop into the equivalent rigid system speed loop model, inputting a difference signal obtained by subtracting an output of the equivalent rigid system speed loop model from a speed signal of the load into the band-pass filter, inputting an output of the band-pass filter into the amplitude adjuster and outputting a signal obtained by adding an output of the amplitude adjuster to an output of a position controller, as a new speed command.

The invention also provides a full-closed control apparatus for performing speed control based on a speed signal of a motor and performing position control based on a position signal of a load driven by the motor, including: an all-pass filter; a band-pass filter; an amplitude adjuster; and a unit for inputting a difference signal obtained by subtracting a speed command of a speed control loop from a speed signal of the load into the all-pass filter, inputting an output of the all-pass filter into the band-pass filter, inputting an output of the band-pass filter into the amplitude adjuster and outputting a signal obtained by adding an output of the amplitude adjuster to an output of a position controller, as a new speed command.

The invention further provides a full-closed control apparatus for performing speed control based on a speed signal of a motor and performing position control based on a position signal of a load driven by the motor, including: an equivalent rigid system speed loop model; an all-pass filter; a band-pass filter; an amplitude adjuster; and a unit for inputting a speed command of a speed control loop into the equivalent rigid system speed loop model, inputting a difference signal obtained by subtracting an output of the equivalent rigid system speed loop model from a speed signal of the load into the all-pass filter, inputting an output of the all-pass filter into the band-pass filter, inputting an output of the band-pass filter into the amplitude adjuster and outputting a signal obtained by adding an output of the amplitude adjuster to an output of a position controller, as a new speed command.

DESCRIPTION OF THE PREFERRED EMBODIMENTS

Figure 1:
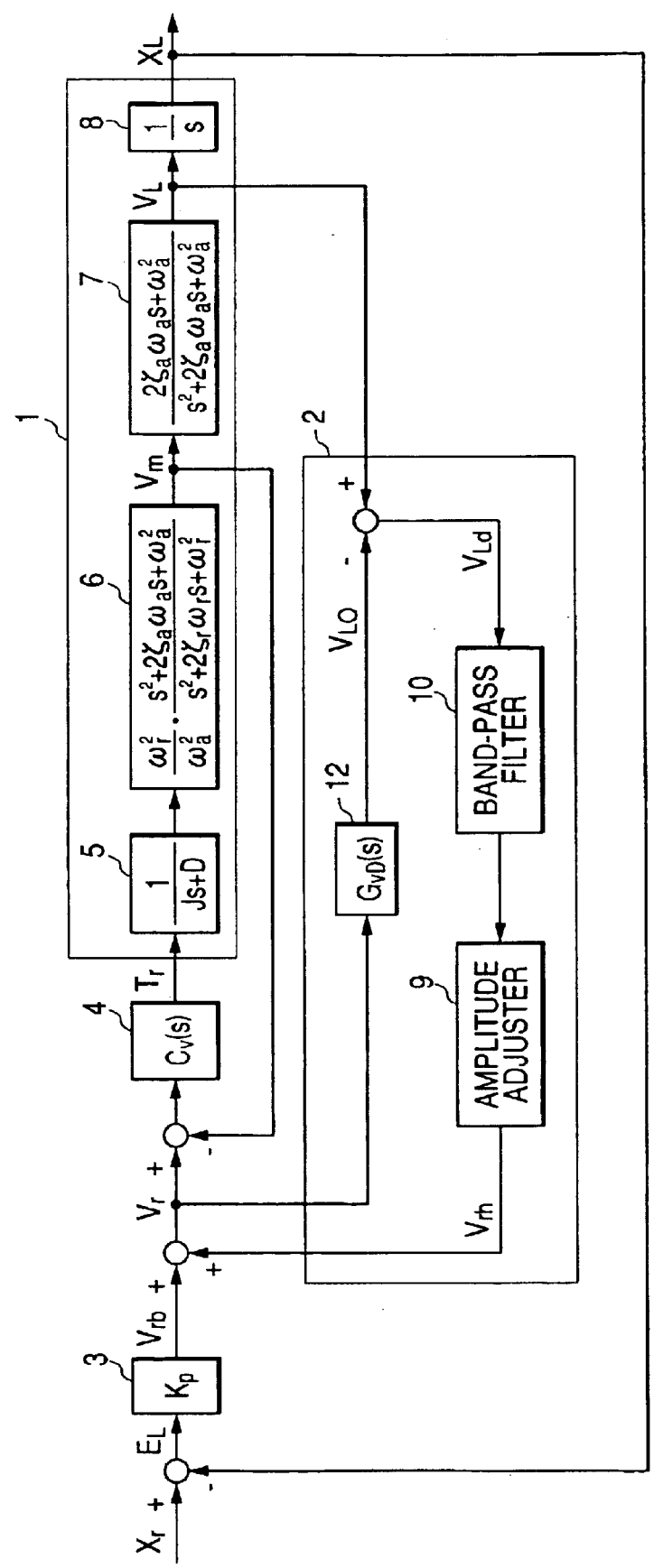
FIG. 1 is a diagram showing a first embodiment of the invention.
Figure 5:
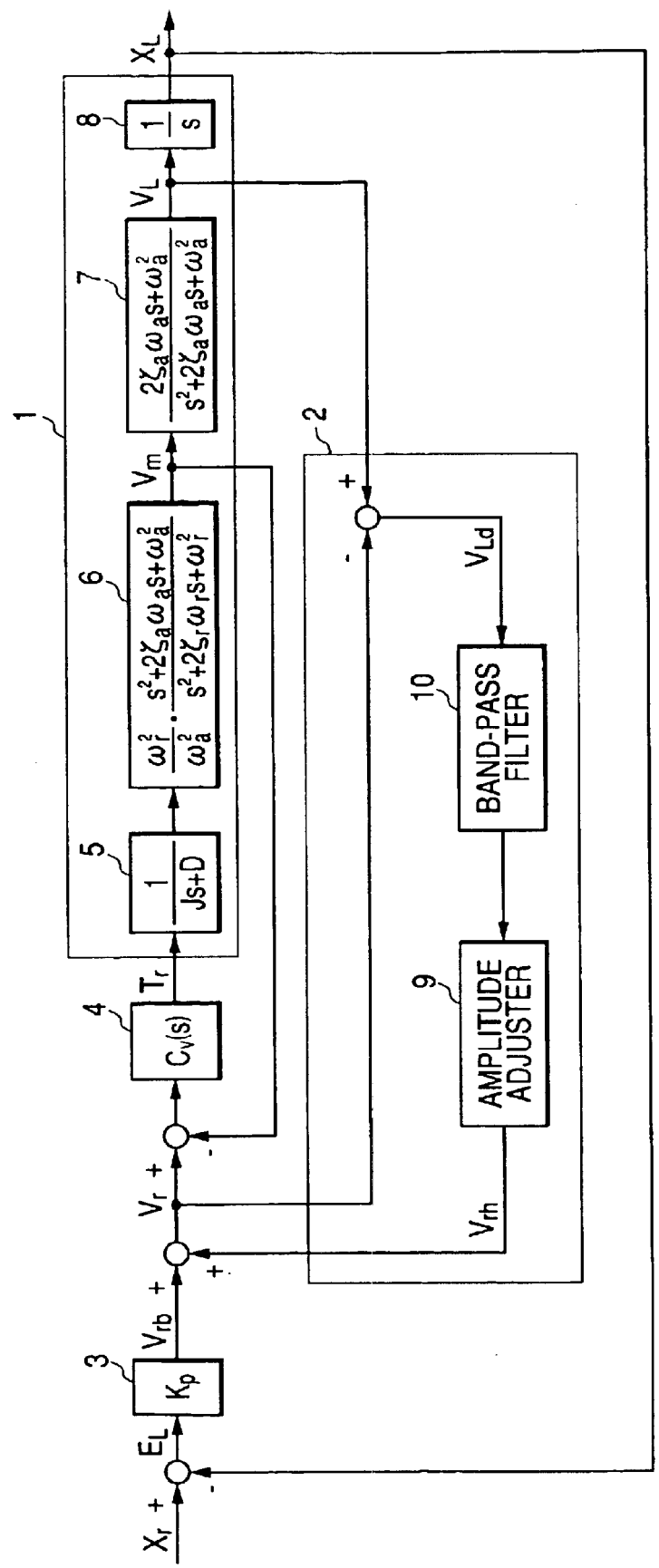
FIG. 5 is a diagram showing a control system in the related art.
Figure 6:
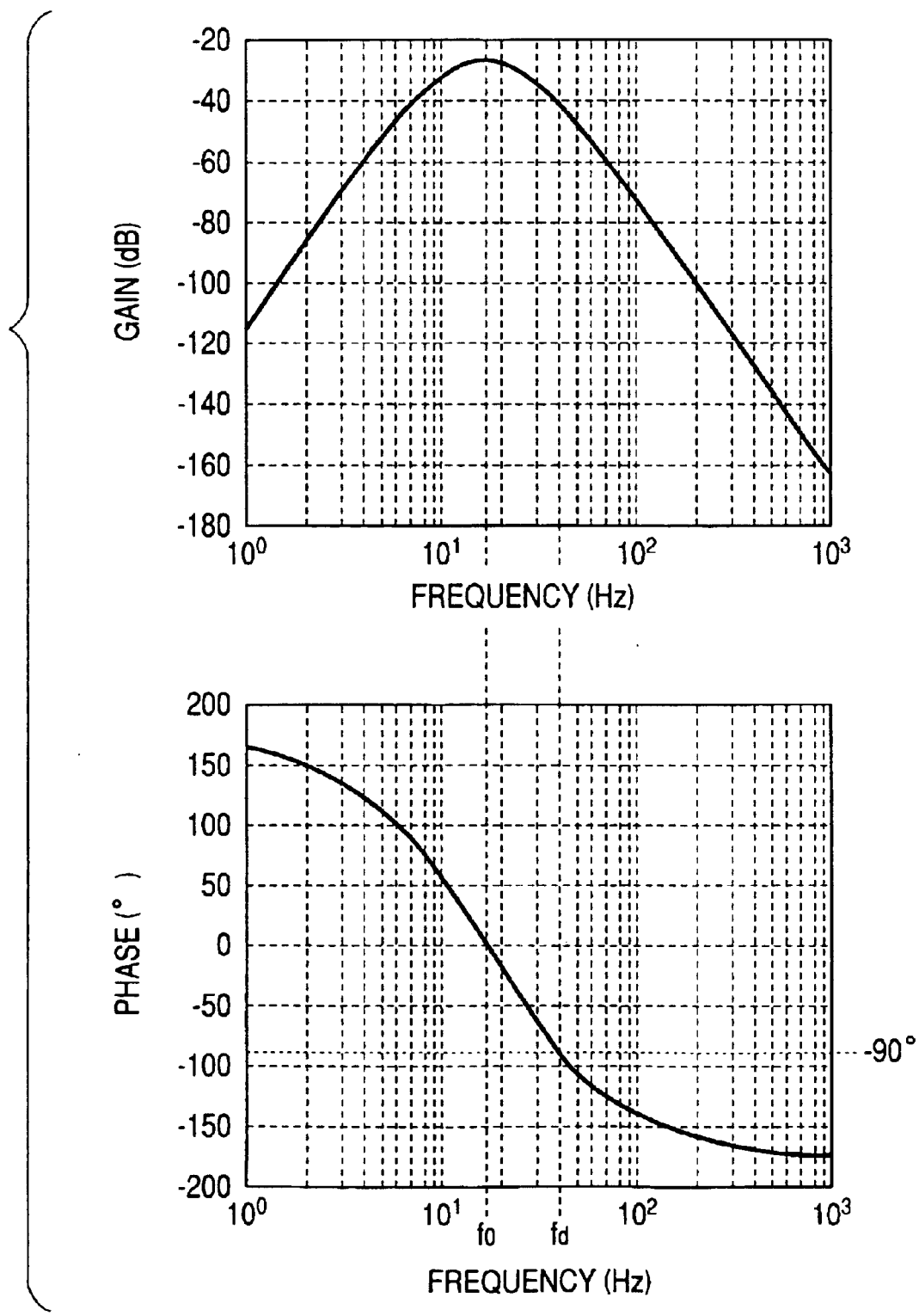
FIG. 6 is a Bode diagram of the band-pass filter depicted in FIGS. 1 and 5.

Specific embodiments of the invention will be described below. FIG. 1 shows a first embodiment of the invention. A control system shown in FIG. 1 is configured by addition of an equivalent rigid system speed loop model 12 to the control system (FIG. 5) in the related art. In FIG. 1, a difference signal $V_{Ld}$ obtained from subtracting an output $V_{L0}$ of the equivalent rigid system speed loop model 12 from a load speed signal $V_L$ is input into the band-pass filter 10. An output of the band-pass filter 10 is input into the amplitude adjuster 9. A signal obtained by adding a speed command compensatory signal $V_{rh}$ as an output of the amplitude adjuster 9 to the speed command basic signal $V_{rb}$ is set as a new speed command $V_r$.

Figure 4:
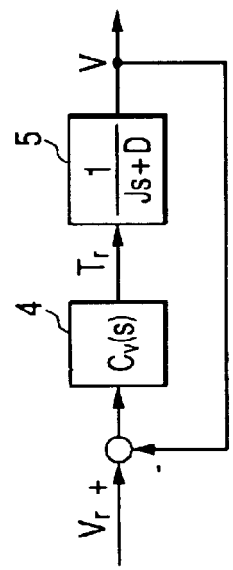
FIG. 4 is a block diagram of an equivalent rigid system speed loop.

A principle for suppression of vibration of a position loop will be described below. The equivalent rigid system speed loop model $G_{vo}(s)$ is an input/output transfer function of a closed loop constituted by a combination of a speed controller 4 and an equivalent rigid system 5 as shown in FIG. 4. That is, $G_{vo}(s)$ is given as follows.

[Expression 1]

$$G_{V0}(s) = \frac{C_V(s)\frac{1}{Js+D}}{1+C_V(s)\frac{1}{Js+D}} = \frac{C_V(s)}{Js+D+C_V(s)} \quad (1)$$

Figure 9:
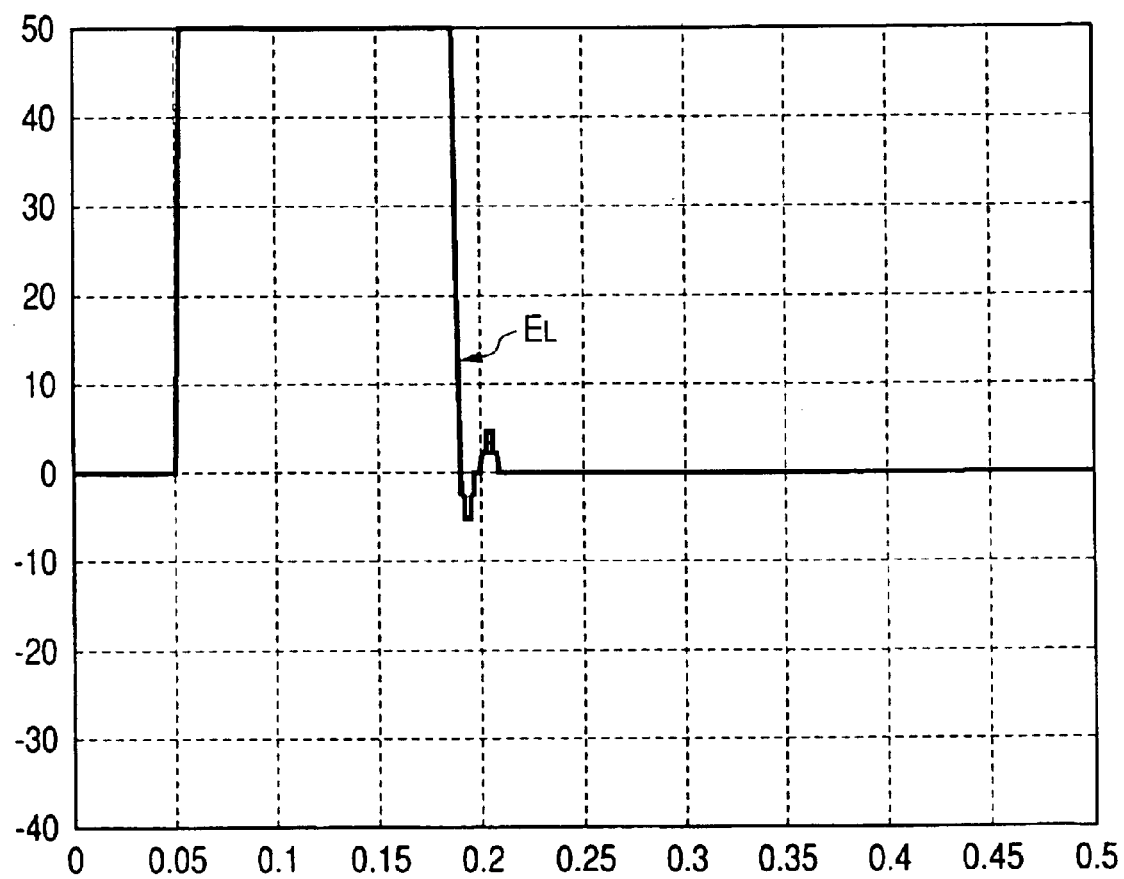
FIG. 9 is a graph showing a result of simulation in the first embodiment of the invention.

When the mechanical system is a rigid system on the assumption that there is neither disturbance nor identification error, $V_{Ld}(=V_L-V_{L0})$ is zero because it is obvious that $V_{L0}$ is equal to $V_L$. Accordingly, when the mechanical system is an inertial system, $V_{Ld}$ contains no signal but a vibration signal (frequency:$f_d$) of load speed. When the phase and gain of $V_{Ld}$ are adjusted by the band-pass filter and the amplitude adjuster to cancel a vibration mode contained in the speed command basic signal $V_{rh}$, the position loop can be stabilized even in the case where the gain of the position controller is high. Because $V_{Ld}$ contains no low-frequency component, that is, because $V_{rh}$ contains no low-frequency component, addition of the speed command compensatory signal $V_{rh}$ to the speed command basic signal $V_{rb}$ exerts no influence on response characteristic in a low-frequency region. That is, the problem that low-frequency vibration or overshooting is caused by combination of the load vibration suppression compensator can be avoided (FIG. 9).

Figure 2:
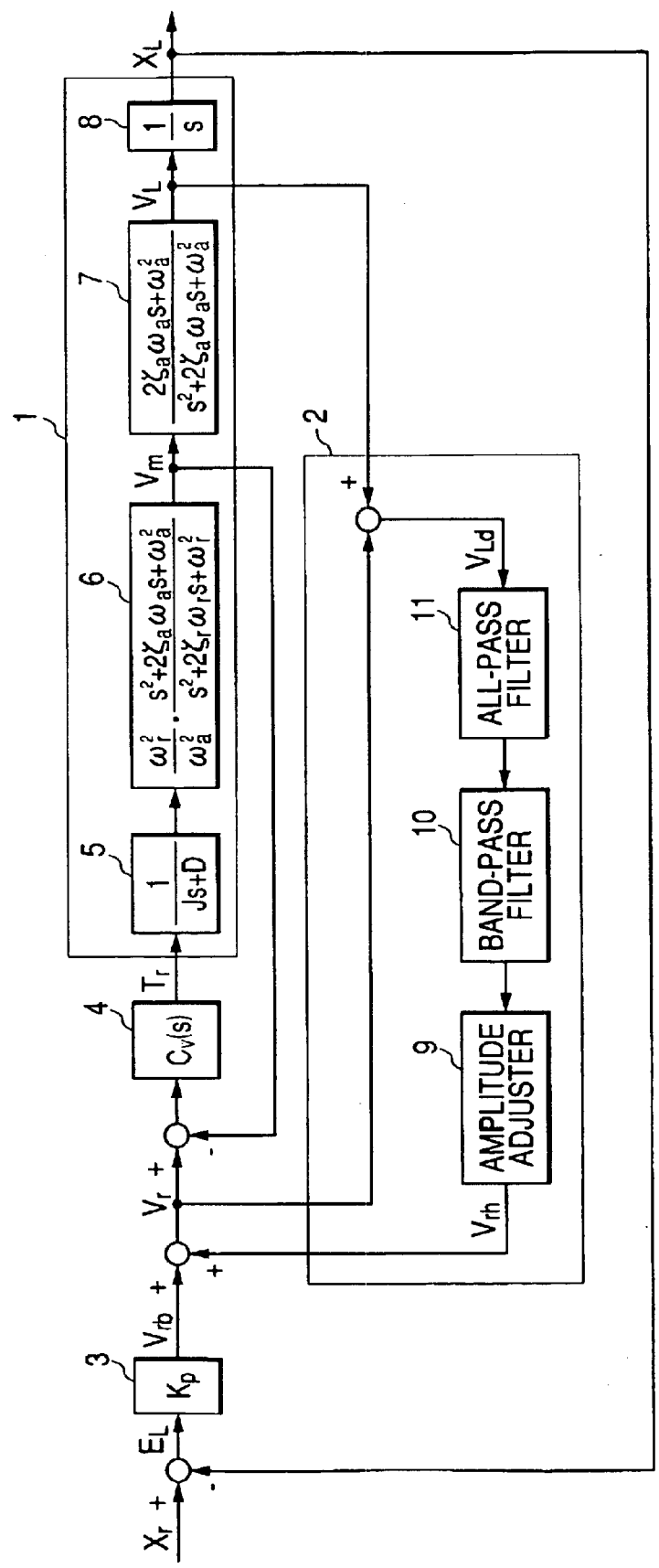
FIG. 2 is a diagram showing a second embodiment of the invention.

FIG. 2 shows a second embodiment of the invention. A control system shown in FIG. 2 is configured by addition of an all-pass filter 11 to the control system (FIG. 5) in the related art. In FIG. 2, a difference signal $V_{Ld}$ obtained by subtracting a speed command $V_r$ from a load speed signal $V_L$ is input into the all-pass filter 11. An output of the all-pass filter 11 is input into the band-pass filter 10. An output of the band-pass filter 10 is input into the amplitude adjuster 9. A signal obtained by adding a speed command compensatory signal $V_{rh}$ as an output of the amplitude adjuster 9 to the speed command basic signal $V_{rb}$ is set as a new speed command $V_r$.

A principle for suppression of vibration of a position loop will be described below.

Figure 7:
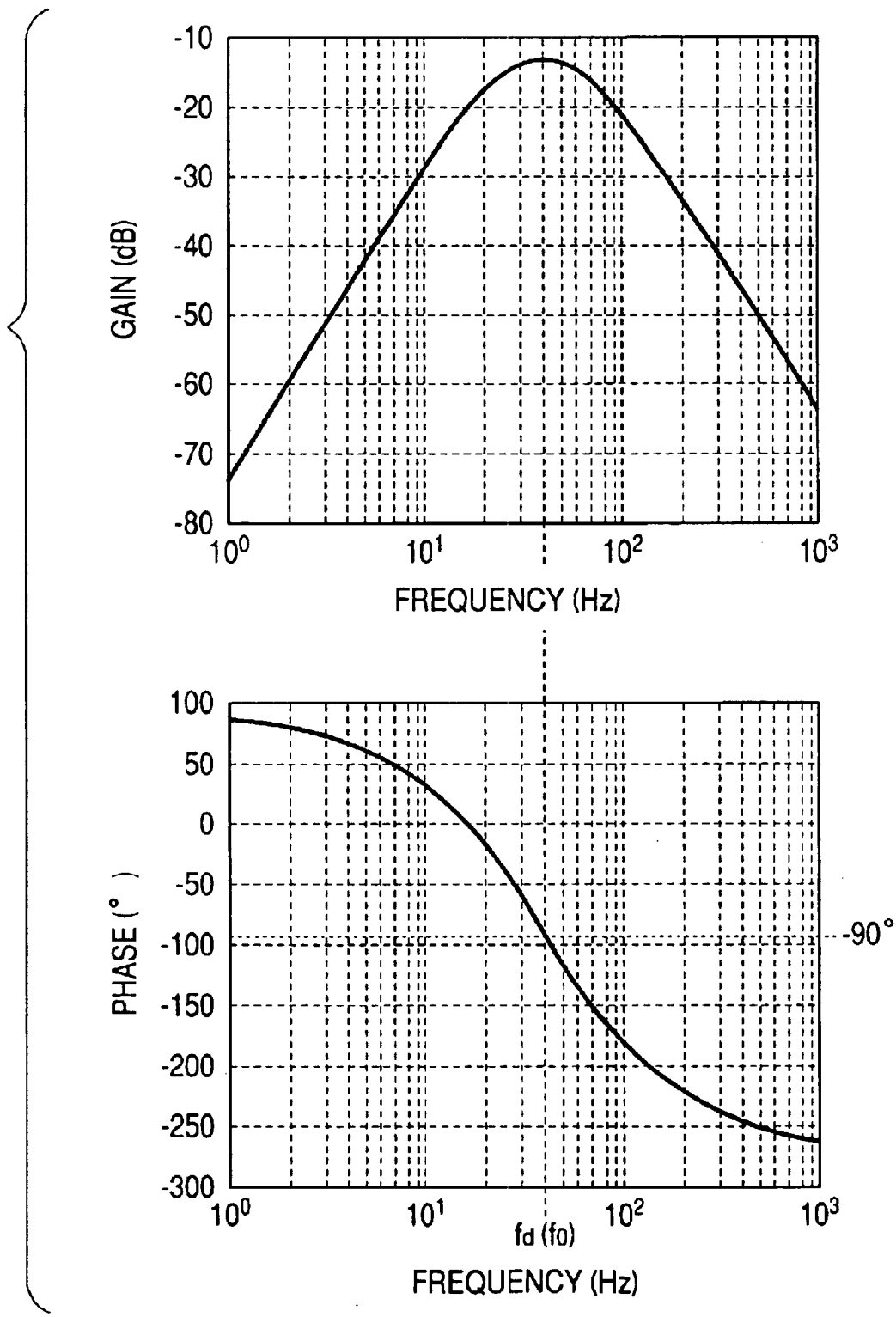
FIG. 7 is a Bode diagram of a phase and gain adjuster constituted by a combination of the band-pass filter and the all-pass filter depicted in FIGS. 2 and 3.
Figure 8:
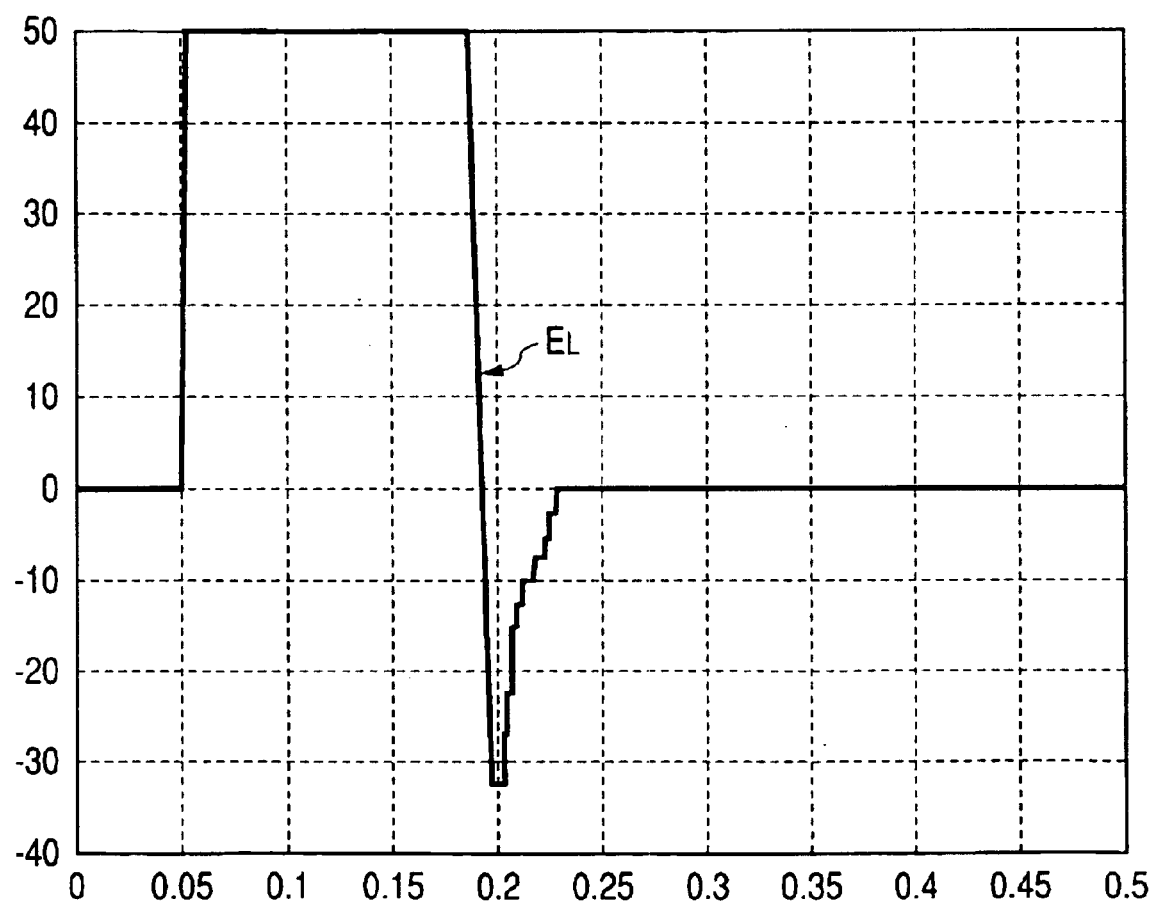
FIG. 8 is a graph showing a result of simulation in the related art.

The gain of the all-pass filter is always 1 though the phase varies according to change in filter parameter and frequency. Because the all-pass filter in this embodiment is used as an exclusive phase adjuster, the band-pass filter need not be used for phase adjustment. Accordingly, the band-pass filter can be configured so that the center frequency $f_o$ of the pass band in the band-pass filter coincides with the oscillation frequency $f_d$ of the position loop. When, for example, the all-pass filter and the band-pass filter are constituted by a linear filter $((S-\omega_d)/(S+\omega_d), \omega_d=2\pi f_d)$ and a combination of a one-stage low-pass filter $(1/(1+T_f s))$ and a one-stage high-pass filter $(T_f s/(1+T_f s))$ respectively in the case where the oscillation frequency $f_d$ of the position loop is 40 Hz, the center frequency $f_o$ of the pass band in the band-pass filter is 40 Hz (FIG. 7) because a phase delay of 90° is given to a point of 40 Hz. The linear all-pass filter can be constituted by a simple low-pass filter represented by the following expression.

[Expression 2]

$$\frac{s-\omega_d}{s+\omega_d} = 1 - 2\frac{\omega_d}{s+\omega_d} \quad (2)$$

Figure 10:
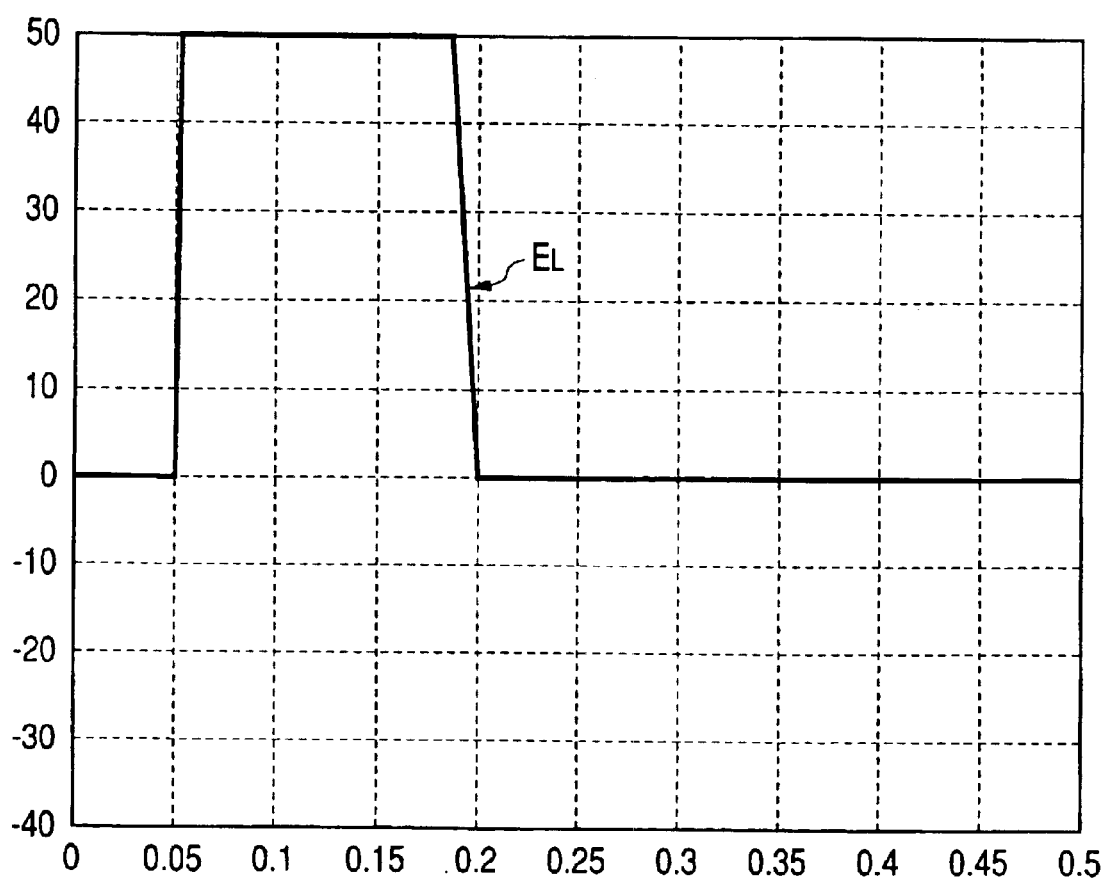
FIG. 10 is a graph showing a result of simulation in the second embodiment of the invention.

In this manner, even in the case where the gain of the speed controller is low, $V_{Ld}$ ($=V_L-V_r$) contains a low-frequency component. The low-frequency component is however removed by the band-pass filter because the center frequency $f_0$ of the pass band in the band-pass filter is high as described above. When a signal of a frequency $f_d$ contained in $V_{Ld}$ passes through the all-pass filter and the amplitude adjuster, the phase and gain of the signal are adjusted to cancel the vibration mode contained in the speed command basic signal. Accordingly, when the speed command compensatory signal $V_{rh}$ is added to the speed command basic signal $V_{rb}$, the vibration of the position loop is suppressed so that low-frequency vibration or overshooting can be avoided (FIG. 10).

Figure 3:
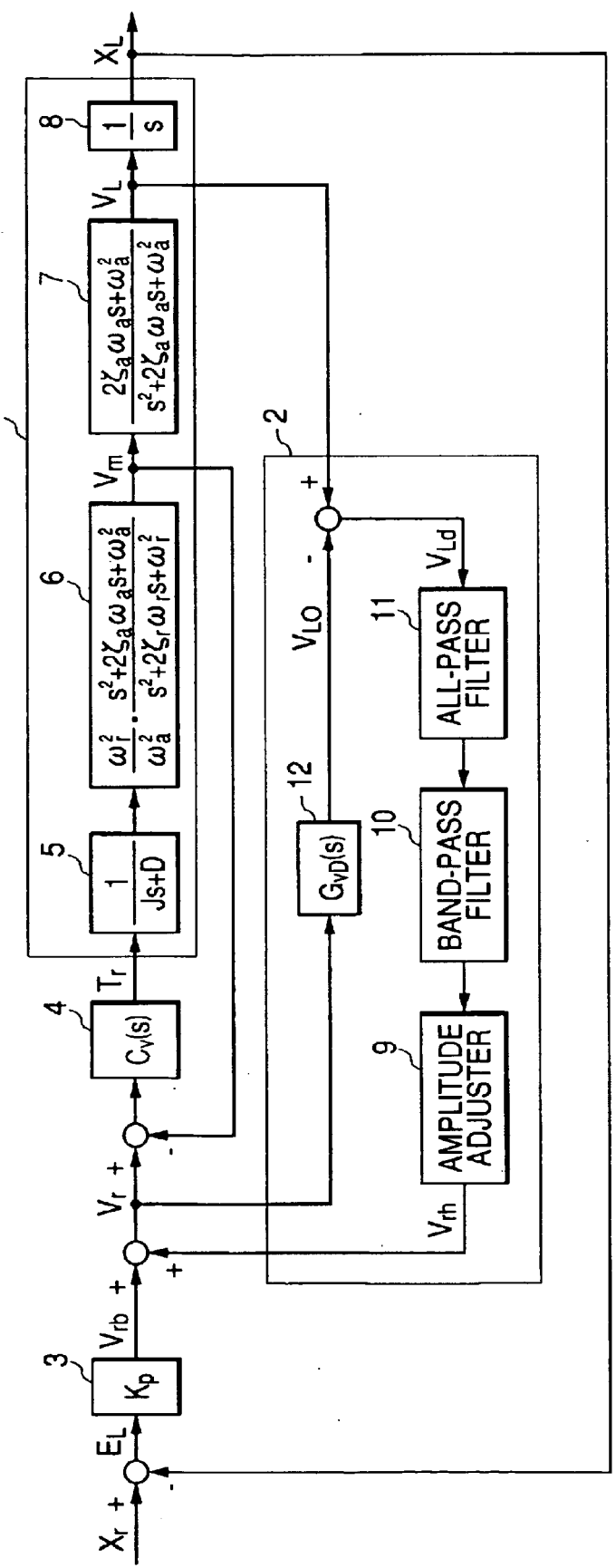
FIG. 3 is a diagram showing a third embodiment of the invention.

A third embodiment of the invention will be described with reference to FIG. 3. A control system shown in FIG. 3 is configured by addition of an equivalent rigid system speed loop model 12 and an all-pass filter 11 to the control system (FIG. 5) in the related art. In FIG. 3, a difference signal $V_{Ld}$ obtained by subtracting an output $V_{Lo}$ of the equivalent rigid system speed loop model 12 from a load speed signal $V_L$ is input into the all-pass filter 11. An output of the all-pass filter 11 is input into the band-pass filter 10. An output of the band-pass filter 10 is input into the amplitude adjuster 9. A signal obtained by adding a speed command compensatory signal $V_{rh}$ as an output of the amplitude adjuster 9 to the speed command basic signal $V_{rb}$ is set as a new speed command $V_r$.

A principle for suppression of vibration of a position loop will be described below.

For the same reason as in the first embodiment, when there is neither disturbance nor identification error, $V_{Ld}$ contains no signal but a vibration signal (frequency: $f_d$) of load speed. For the same reason as in the second embodiment, even when there is disturbance or identification error, all components except the oscillation frequency $f_d$ of the position loop are removed after passing through the band-pass filter. Finally, the vibration of the position loop can be suppressed, so that low-frequency vibration or overshooting can be avoided.

As described above, in accordance with the invention, the vibration signal of the position loop contained in the speed command basic signal is canceled by the speed command compensatory signal, so that the gain of the position loop can be increased. In addition, because the speed loop model or the all-pass filter is added, low-frequency vibration or overshooting can be avoided. That is, speedy and accurate positioning can be achieved.

What is claimed is:

1. A full-closed control apparatus for performing speed control based on a speed signal of a motor and performing position control based on a position signal of a load driven by said motor, comprising:

an equivalent rigid system speed loop model;

a band-pass filter;

an amplitude adjuster; and speed-command compensation means for inputting a speed command of a speed control loop into said equivalent rigid system speed loop model, inputting a difference signal obtained by subtracting an output of said equivalent rigid system speed loop model from a speed signal of said load into said band-pass filter, inputting an output of said band-pass filter into said amplitude adjuster and outputting a signal obtained by adding an output of said amplitude adjuster to an output of a position controller, as a new speed command.

2. A full-closed control apparatus for performing speed control based on a speed signal of a motor and performing position control based on a position signal of a load driven by said motor, comprising:

an all-pass filter;

a band-pass filter;

an amplitude adjuster; and speed-command compensation means for inputting a difference signal obtained by subtracting a speed command of a speed control loop from a speed signal of said load into said all-pass filter, inputting an output of said all-pass filter into said band-pass filter, inputting an output of said band-pass filter into said amplitude adjuster and outputting a signal obtained by adding an output of said amplitude adjuster to an output of a position controller, as a new speed command.

3. A full-closed control apparatus for performing speed control based on a speed signal of a motor and performing position control based on a position signal of a load driven by said motor, comprising:

an equivalent rigid system speed loop model;

an all-pass filter;

a band-pass filter;

an amplitude adjuster; and speed-command compensation means for inputting a speed command of a speed control loop into said equivalent rigid system speed loop model, inputting a difference signal obtained by subtracting an output of said equivalent rigid system speed loop model from a speed signal of said load into said all-pass filter, inputting an output of said all-pass filter into said band-pass filter, inputting an output of said band-pass filter into said amplitude adjuster and outputting a signal obtained by adding an output of said amplitude adjuster to an output of a position controller, as a new speed command.

* * * * *